United States Patent [19]

Nishino et al.

[11] Patent Number: 4,945,153
[45] Date of Patent: Jul. 31, 1990

[54] METHOD OF PRODUCING PREPOLYMER OF AROMATIC POLYTHIAZOLE IN THE PRESENCE OF A PHOSPHORIC ACID COMPOUND

[75] Inventors: Hideo Nishino, Miyoshi; Tatsuya Hattori, Wako; Tsuneharu Kushida; Masataka Kumata, both of Tokyo, all of Japan

[73] Assignee: Honda Giken Kogyo Kabushiki Kaisha, Tokyo, Japan

[21] Appl. No.: 362,513

[22] Filed: Jun. 7, 1989

[30] Foreign Application Priority Data

Jun. 8, 1988 [JP] Japan ................................. 63-140807

[51] Int. Cl.$^5$ ............................................ C08G 75/32
[52] U.S. Cl. ..................................... 528/337; 528/336
[58] Field of Search ................................. 528/337, 336

[56] References Cited

U.S. PATENT DOCUMENTS 4,359,567 11/1982 Evers .................................. 528/179
4,606,875 8/1986 Chenevey et al. .................. 528/337
4,622,285 11/1986 Ahne ................................... 430/322

Primary Examiner—Harold D. Anderson
Attorney, Agent, or Firm—Birch, Stewart, Kolasch & Birch

[57] ABSTRACT

A method of producing a prepolymer of aromatic polythiazole from an aromatic diaminodithiol compound salt and a dicarboxylic acid derivative, comprising the step of polymerizing the aromatic diaminodithiol compound salt and the dicarboxylic acid derivative in the presence of a phosphoric acid compound at a temperature of 70°–140° C.

4 Claims, 8 Drawing Sheets

METHOD OF PRODUCING PREPOLYMER OF AROMATIC POLYTHIAZOLE IN THE PRESENCE OF A PHOSPHORIC ACID COMPOUND

BACKGROUND OF THE INVENTION

The present invention relates to a method of stably producing prepolymers of aromatic polythiazoles which can be converted by heating to rigid, high-strength aromatic polymers having excellent heat resistance, mechanical properties, chemical resistance, electric properties etc.

Conventionally, aromatic polythiazole has been produced from an aromatic dimercaptodiamine compound and a dicarboxylic acid derivative, particularly a chloride thereof. Because of its excellent mechanical strength, the aromatic polythiazole is expected to be used as a plastic material substituting for metal materials, alone or in combination with other engineering plastics.

In these circumstances, attempts have been proposed to provide polymer blend-type composite materials having so-called interstitial structure (molecular composite materials) by dispersing so-called rigid, high-strength aromatic polymers such as aromatic polythiazole in soft matrix polymers finely to the extent of molecular level. Since the unidirectional orientation of the molecular chains of rigid, high-strength polymers for increasing their strength is not performed in such molecular composite materials, the molecular composite materials show little anisotropy and excellent mechanical strength, heat resistance, solvent resistance etc.

However since the rigid, high-strength aromatic polymers such as aromatic polythiazole have extremely low dispersibility in matrixes of other polymers, it is practical matter difficult to produce the above molecular composite materials. In this circumstance, the present inventors previously noticed that prepolymers of rigid, high-strength aromatic polymers such as aromatic polythiazole are soluble in organic solvents together with matrix polymers such as nylons or their prepolymers, and found that by first blending the prepolymers of rigid, high-strength aromatic polymers with matrix polymers or their prepolymers in organic solvents and then heating the resulting blends to cause a ring closure reaction of the prepolymers of rigid, high-strength aromatic polymers, molecular composite materials containing uniformly dispersed rigid, high-strength aromatic polymers can be obtained. Based on this finding, the inventors previously filed patent applications for methods of producing such molecular composite materials in Japan (Japanese Patent Application Nos. 62-158631, 62-158632 and 62-172563).

In the meantime, the prepolymers of aromatic polythiazole have generally been produced by heating mixtures of aromatic diaminodithiol compounds or their salts and dicarboxylic acids or their derivatives in the presence of polyphosphoric acids, etc., at a temperature of 160° C. or higher. However, it is difficult to control the polymerization reaction by heating to the above temperature in the presence of polyphosphoric acids. Thus, the polymerization reaction often proceeds to form polythiazoles. Therefore, various attempts have been made to provide the prepolymer of aromatic polythiazole.

Japanese Patent Laid-Open No. 60-223824 discloses a method of producing polythiazole prepolymers by reacting aromatic and/or heterocyclic diaminodithiol compounds with dicarboxylic acids in the presence of carbodiimide.

However, since the above reaction is carried out in the presence of carbodiimide, the actually formed polythiazole prepolymers are those having low molecular weights, suitable for photoresists, despite the description that the reaction proceeds at such a temperature that the prepolymers are not converted to inactive ring-closed products. The above low-molecular weight prepolymers are not suitable as prepolymers of high-strength polymers which are to be used in molecular composite materials.

OBJECT AND SUMMARY OF THE INVENTION

Accordingly, an object of the present invention is to provide a method of stably and efficiently producing a prepolymer of aromatic polythiazole which can be converted by heating to a rigid, high-strength aromatic polymer having excellent thermal stability, mechanical strength and chemical resistance by intramolecular ring closure.

As a result of intense research in view of the above object, the inventors have found that a prepolymer of aromatic polythiazole can be stably formed by polymerizing an aromatic diaminodithiol compound salt and a dicarboxylic acid derivative in the presence of a phosphoric acid compound at a relatively low temperature. The present invention is based on the above finding.

Thus, the method of producing a prepolymer of aromatic polythiazole according to the present invention comprises the step of polymerizing the aromatic diaminodithiol compound salt and the dicarboxylic acid derivative in the presence of a phosphoric acid compound at a temperature of 70°–140° C.

DETAILED DESCRIPTION OF THE INVENTION

Figure 1:
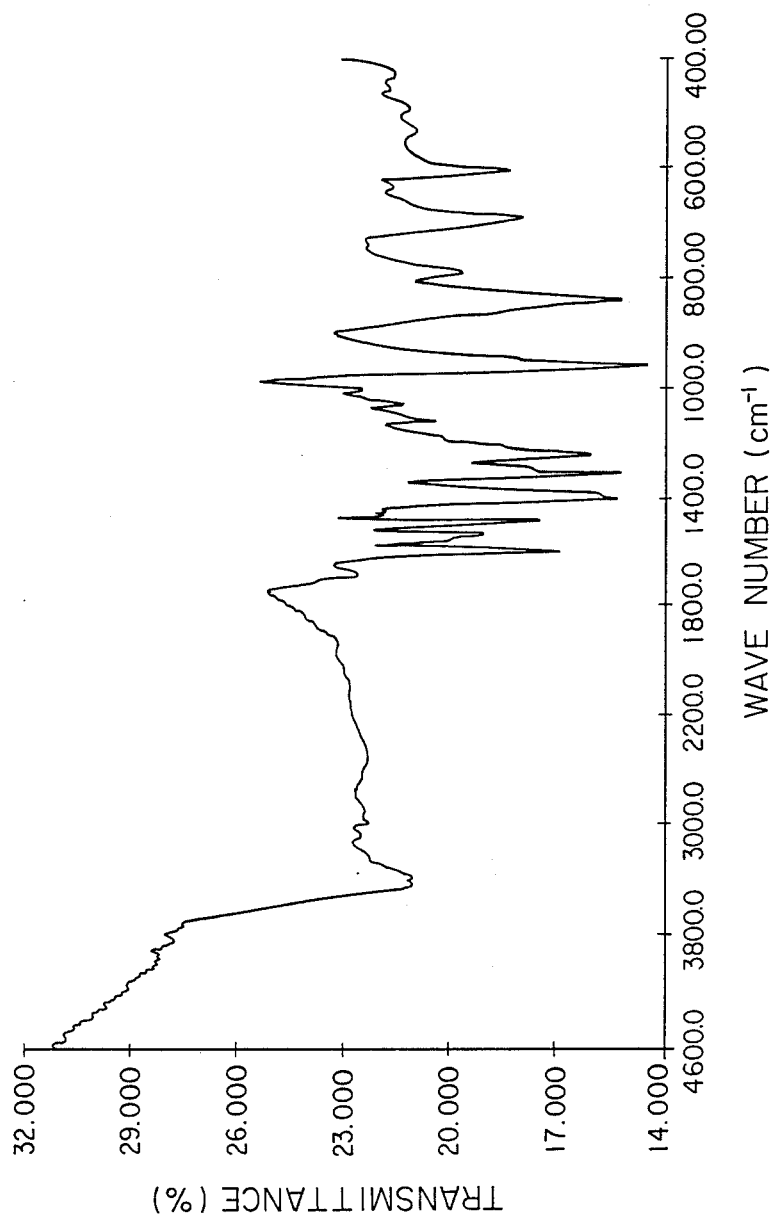
FIG. 1 is a graph showing an infrared spectrum of the product in Example 1.

The present invention will be explained in detail below.

The aromatic diaminodithiol compound which may be used in the form of a salt in the present invention is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group $R_1$ symmetrically with respect to its axis or its central point. Typical examples of such aromatic diaminodithiol compounds are:

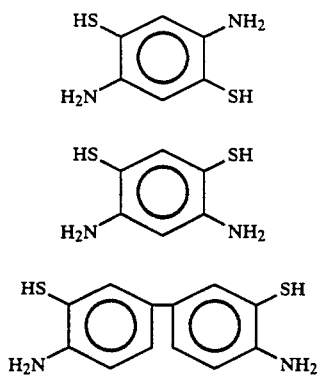

These aromatic diaminodithiol compounds are used in the form of salts such as hydrochlorides to increase their reactivities.

The dicarboxylic acid derivatives used in the present invention include those having carboxylic groups substituted as follows:

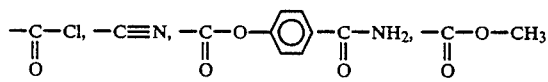

The residual groups of the above dicarboxylic acid derivatives are preferably aromatic groups. A preferred example of such dicarboxylic acids is terephthalic acid.

In order to carry out the polymerization of the aromatic diaminodithiol compound salts and the dicarboxylic acid derivatives, they are dissolved in solvents such as N-methyl-2-pyrrolidone, hexamethylphosphoric triamide, etc., containing phosphoric acid compounds. Alternatively, without using such solvents, phosphoric acid compounds such as polyphosphoric acids may be used as solvents.

In a case where a salt of the aromatic diaminodithiol compound is used, it may be dissolved in an alkali aqueous solution to remove counter ions of the salt, thereby increasing its reactivity. The alkalis used in the aqueous solution include sodium hydrogen carbonate, potassium hydrogen carbonate, sodium hydroxide, etc. The alkalis have a function to neutralize by-products such as HCl generated in the polymerization reaction, thereby increasing the reaction rate.

To cause the polymerization reaction, the phosphoric acid compound is added to the reaction system. The preferred phosphoric acid compound is polyphosphoric acid. Polyphosphoric acid, which is also called condensed phosphoric acid, may usually be produced by heating phosphoric acid together with diphosphorus pentoxide ($P_2O_5$), by dehydration of orthophosphoric acid by heating, by heating diphosphorus pentoxide in pure water, by a high-temperature reaction between orthophosphoric acid and phosphorus oxychloride, etc. The concentration of polyphosphoric acid is expressed as a percentage which is obtained assuming that orthophosphoric acid is 100%. This percentage is called orthophosphoric acid percentage.

In the polymerization reaction, it is presumed that polyphosphoric acid reacts with the amino groups of the aromatic diaminodithiol compound and the carboxyl groups of the dicarboxylic acid derivative. Accordingly, polyphosphoric acid preferably exists in an amount of 2 mol or more per 1 mol of each aromatic diaminodithiol compound and each dicarboxylic acid derivative. Particularly preferable is to use polyphosphoric acid as a solvent.

In the present invention, polymerization reaction of the aromatic diaminodithiol compound salt and the dicarboxylic acid derivative is carried out at a relatively low temperature. Particularly, the polymerization temperature in the present invention is 70°-140° C. It is critical that the upper limit of the polymerization temperature is 140° C. If it is higher than 140° C. the ring closure reaction of the prepolymer would take place, leading to polythiazole. On the other hand, if it is lower than 70° C., a sufficient polymerization reaction would not take place, and the resulting prepolymer would have a low polymerization degree. The preferred polymerization temperature is 80°-130° C.

In the present invention, to increase the reaction rate of the polymerization reaction, it is preferable to stir the solution. The reaction time is not particularly restricted, but it may generally be 6-18 hours or so.

By conducting the polymerization reaction under the above conditions, the prepolymer of aromatic polythiazole having a large polymerization degree can be obtained without causing a ring closure reaction. The inherent viscosity of the resulting prepolymer of aromatic polythiazole is generally about 0.2-2.0 in chlorosulfonic acid at 30° C.

In the method of the present invention, it may be presumed that the reaction of the aromatic diaminodithiol compound salt and the dicarboxylic acid derivative proceeds as shown below. Here, 2,5-diamino-1,4-benzendithiol dihydrochloride is used as one example of the aromatic diaminodithiol compound salt, and terephthalic acid dichloride is used as one example of the dicarboxylic acid derivative. In the following formulae, PPA and PPA' represent polyphosphoric acid, and "n" represents a polymerization degree.

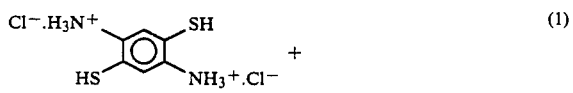

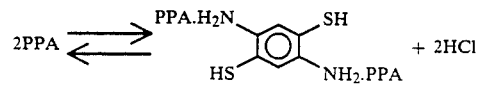

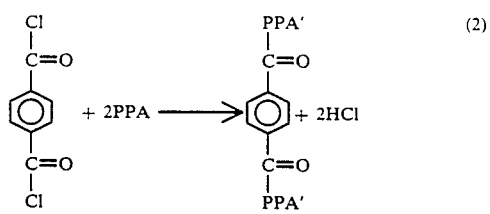

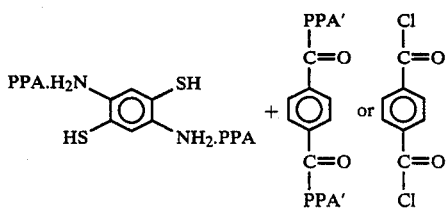

presumably proceeds in either way as shown by (3) or (4) below.

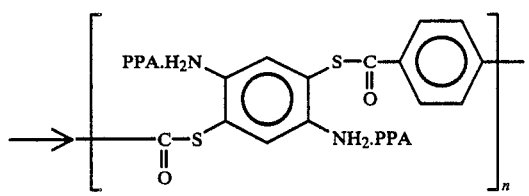

prepolymer of poly-p-phenylenebenzobisthiazole (a).

(4)

prepolymer of poly-p-phenylenebenzobisthiazole (b).

In the reaction (3), the amino groups are bonded to PPA, and the less nucleophilic thiol groups react with the carbonyl groups. On the other hand, in the reaction (4), since the amino groups have a smaller interaction with PPA then with other acids such as hydrochloric acid, the amino groups are sufficiently nucleophilic, reacting with the carbonyl groups.

It has not completely been clarified which structure (a) or (b) is assignable to the prepolymer, but the results of analysis suggest that the structure (a) is more likely. However, both of these prepolymers (a) and (b) are subjected to ring closure by heating, resulting in poly-p-phenylenebenzobisthiazole having the following structure:

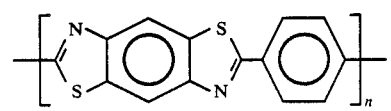

The prepolymer of aromatic polythiazole thus obtained may be washed and dried by a known method.

The polythiazole prepolymer produced according to the method of the present invention provides polythiazole, which is a rigid, high-strength aromatic polymer, by the ring closure reaction by a heat treatment as exemplified below.

(a)

(b)

According to the present invention, since the aromatic diaminodithiol compound salt and the dicarboxylic acid derivative are subjected to a polymerization reaction at a relatively low temperature (70°–140° C.) in the presence of a phosphoric acid compound, the prepolymer of aromatic polythiazole having a large polymerization degree can be obtained without causing a ring closure reaction.

The present invention will be explained in further detail by the following Examples.

Example 1

2.000 g of 2,5-diamino-1,4-benzenedithiol. dihydrochloride was introduced into a 500-ml separable flask provided with a pipe filled with calcium chloride. 113 g of polyphosphoric acid (manufactured by Wako Junyaku K. K.) having an orthophosphoric acid percentage [polyphosphoric acid/ orthophosphoric acid × 100) of 110% was added thereto in an argon flow. The resulting mixture was sufficiently stirred at room temperature for 48 hours and further stirred at 70° C. for 24 hours. Added thereto were 1.656 g of terephthalic acid dichloride (manufactured by Tokyo Kasei K. K., purity 98% or more) and 10 g of polyphosphoric acid, and stirring was conducted at 110° C. for 2 hours.

After completion of the reaction, the reaction solution was added to 500 ml of distilled water, sufficiently stirred, subjected to vacuum filtration by a glass filter (17G4), mixed with an aqueous solution of sodium hydrogen carbonate and then left to stand over night. Next, the same vacuum filtration was conducted, and the filter cake was washed with distilled water several times and then with high grade methanol. It was finally dried at room temperature in vacuum for 48 hours to provide the reaction product.

Comparative Example 1

Instead of terephthalic acid dichloride in Example 1, 1.355 g of terephthalic acid was used, and stirring was continued at 120° C. until terephthalic acid was fully dissolved. After that, the resulting solution was heated to 160° C. and stirred for 2 hours. Under the same conditions as in Example 1 except for those described above, the polymerization reaction was conducted.

On each product obtained in Example 1 and Comparative Example 1, the following analyses were conducted.

(1) Infrared spectrum analysis

Measured by a KBr method using "20DXB" (manufactured by Nikole K. K.).

(2) Thermal analysis

Measured by an analyzer (Rigaku Denki 8110) at a temperature elevation rate of 20° C./min in an $N_2$ atmosphere.

Figure 2:
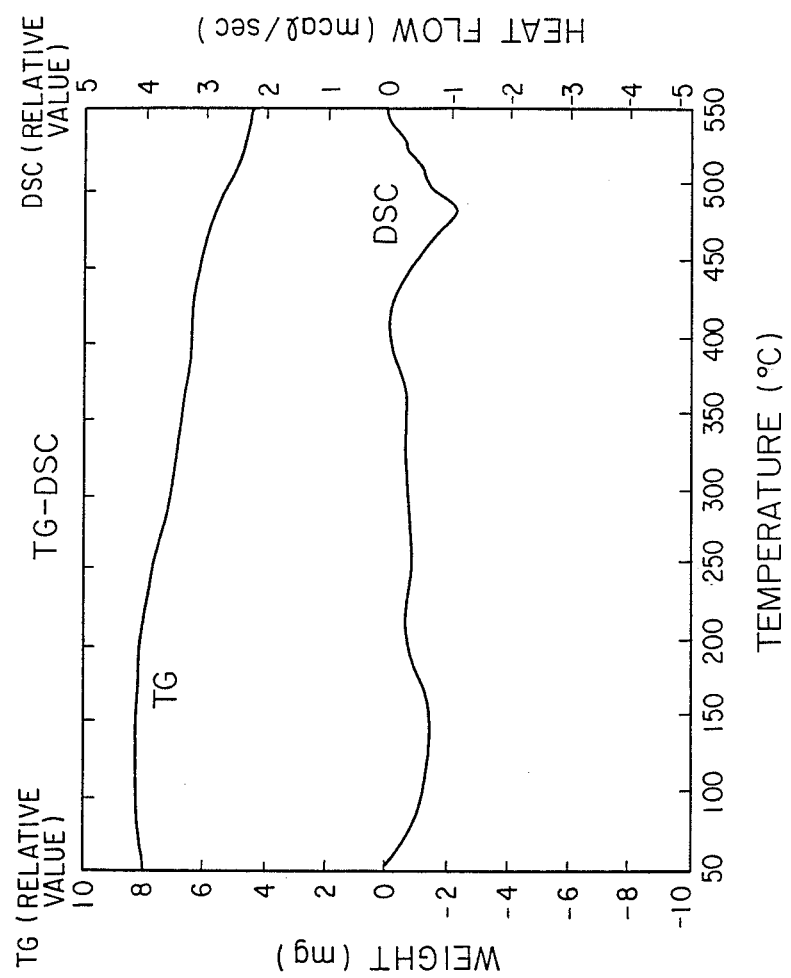
FIG. 2 is a graph showing the results of thermogravimetric analysis and differential scanning calorimetry of the product in Example 1.
Figure 3:
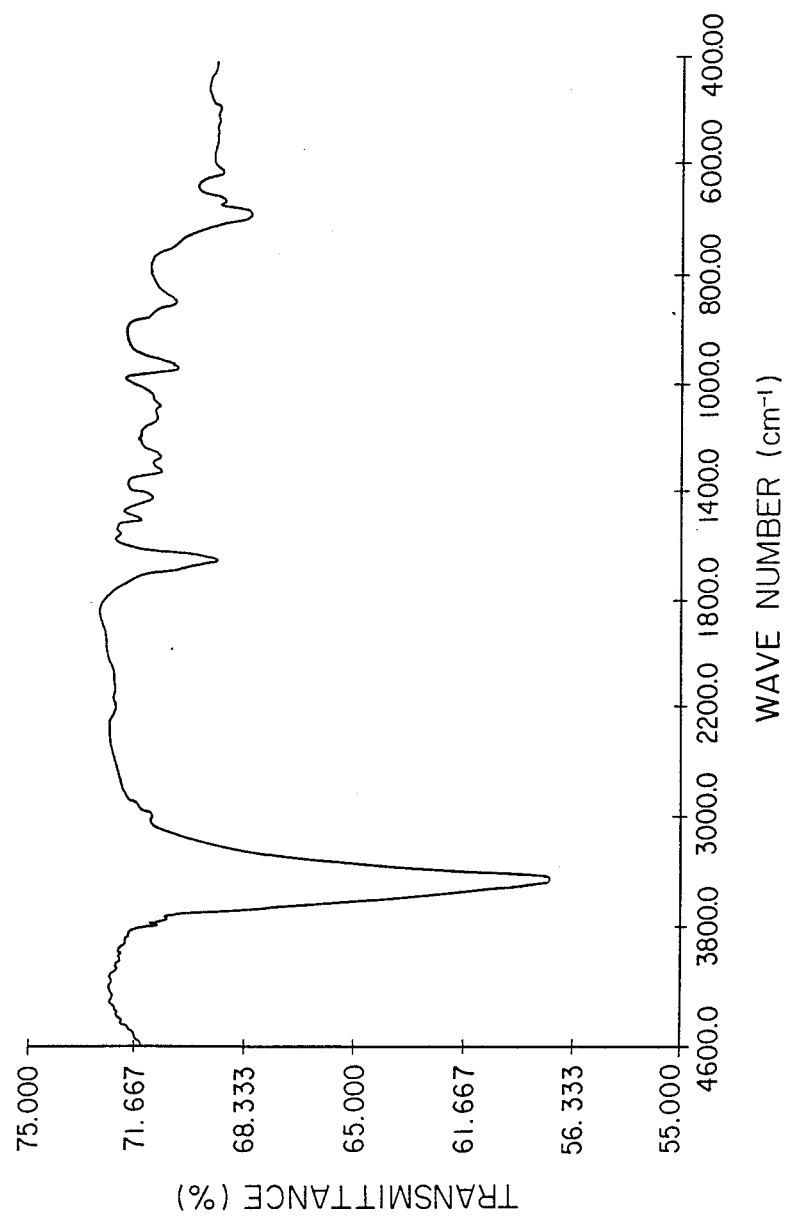
FIG. 3 is a graph showing an infrared spectrum of the product in Comparative Example 1.
Figure 4:
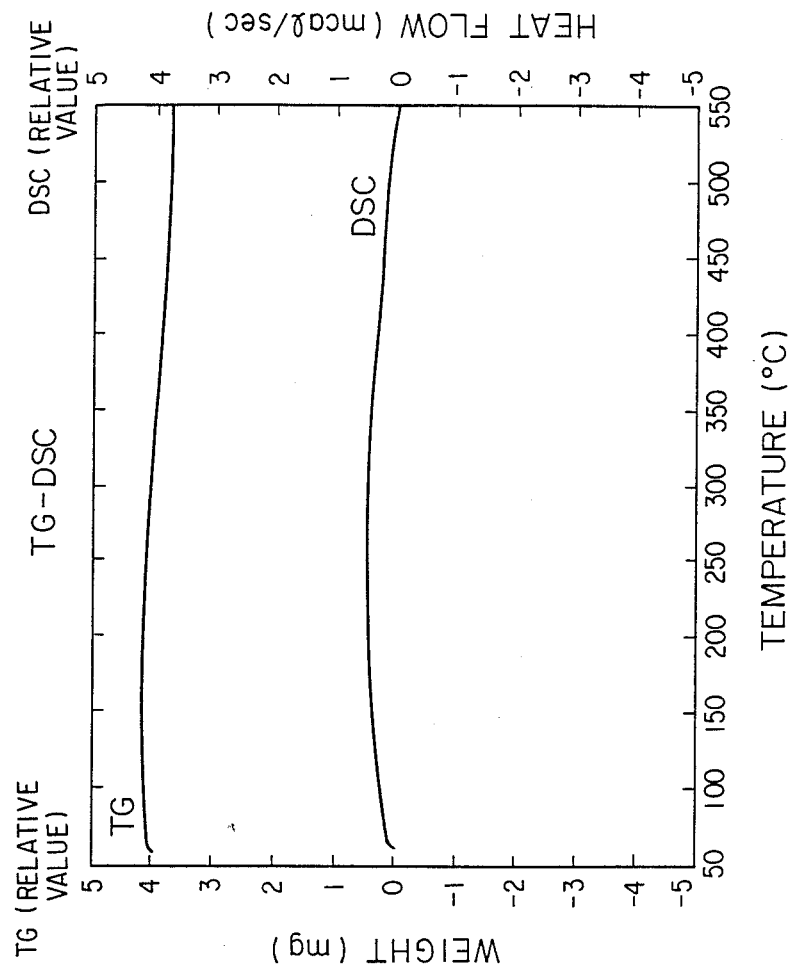
FIG. 4 is a graph showing the results of thermogravimetric analysis and differential scanning calorimetry of the product in Comparative Example 1.

With respect to the polymerization products in Example 1 and Comparative Example 1, FIGS. 1 and 3 show their infrared spectra, and FIGS. 2 and 4 show the results of their thermogravimetric analysis (TG) and differential scanning calorimetry [DSC].

In comparison of FIGS. 1 and 3, FIG. 3 shows an absorption at 1634 cm$^{-1}$ due to the thiazole ring, while FIG. 1 shows absorptions at 3431 cm$^{-1}$ and 1700–1400 cm$^{-1}$ due to the amide groups and an absorption at 1605 cm$^{-1}$ due to the carbonyl group. In addition, the graph of FIG. 3 is substantially the same as an infrared spectrum of poly-p-phenylenebenzobisthiazole. It is confirmed from these results that the product in Example 1 is a prepolymer of poly-p-phenylenebenzobisthiazole having no thiazole ring while the product in Comparative Example 1 is poly-p-phenylenebenzobisthiazole formed by the ring closure reaction of the prepolymer.

The above fact is also confirmed by the comparison of thermogravimetric analyses in FIGS. 2 and 4. Specifically, the product in Example 1 underwent a weight decrease from about 200° C. (FIG. 2), while the product in Comparative Example 1 scarcely underwent such a weight decrease (FIG. 4).

In addition, after the product in Example 1 (prepolymer of poly-p-phenylenebenzobisthiazole) was heated at 220° C. for 12 hours in an Ar atmosphere, substantially no weight decrease was observed by TG like in FIG. 4.

Accordingly, it is clear that the prepolymer of poly-p-phenylenebenzobisthiazole was obtained in Example 1, while the ring closure reaction of such prepolymer took place in Comparative Example 1 by as high a reaction temperature as 160° C., thereby producing poly-p-phenylenebenzobisthiazole.

Incidentally with respect to the structure of the prepolymer in Example 1, it is difficult to determine which structure (a) or (b) is assignable thereto because of weak absorption of SH.

Example 2

The polymerization reaction was conducted under the same conditions as in Example 1 except for changing the temperature condition from 110° C. in Example 1 to 90° C. after mixing 2,5-diamino-14-benzenedithiol dihydrochloride, polyphosphoric acid and terephthalic acid dichloride.

Figure 5:
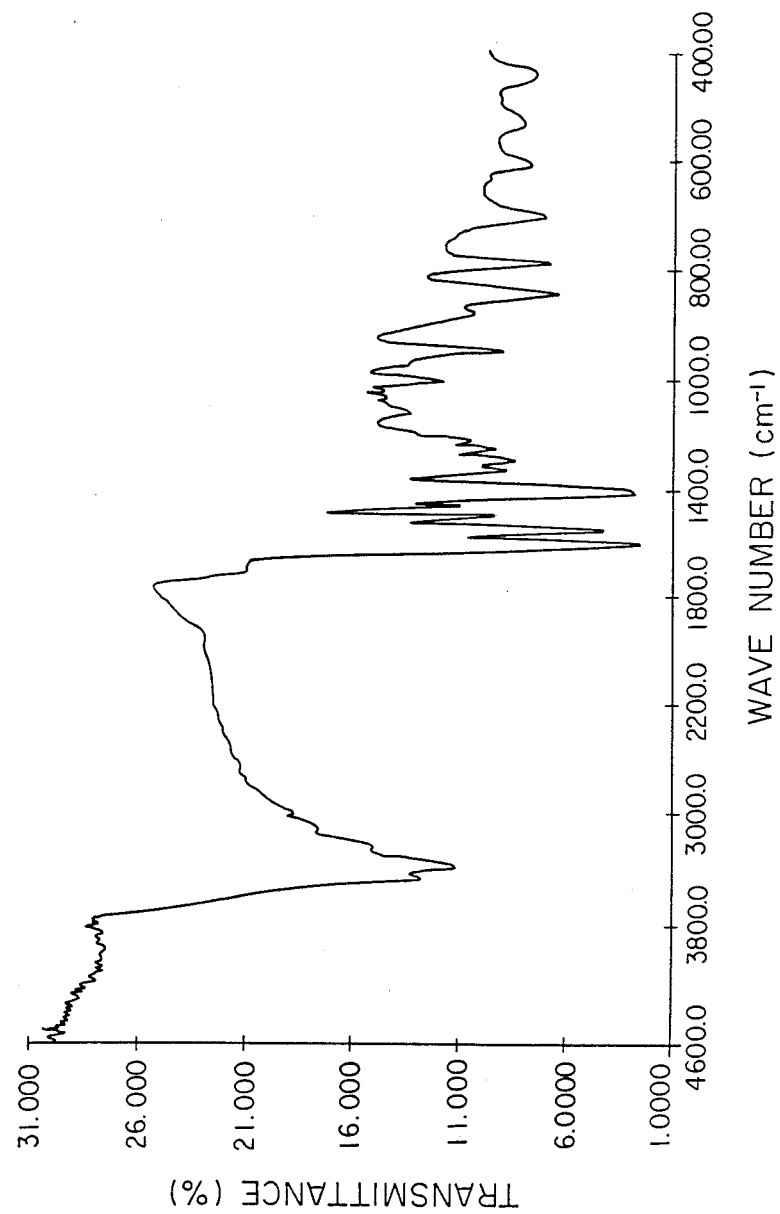
FIG. 5 is a graph showing an infrared spectrum of the product in Example 2.

The resulting product was subjected to infrared spectrum analysis. The results are shown in FIG. 5. It was confirmed from the comparison between FIGS. 1 and 5 that the product in this Example was a prepolymer of poly-p-phenylenebenzobisthiazole.

Example 3

The polymerization reaction was conducted in the same manner as in Example 2 except for changing the temperature condition from 90° C. to 130° C.

Figure 6:
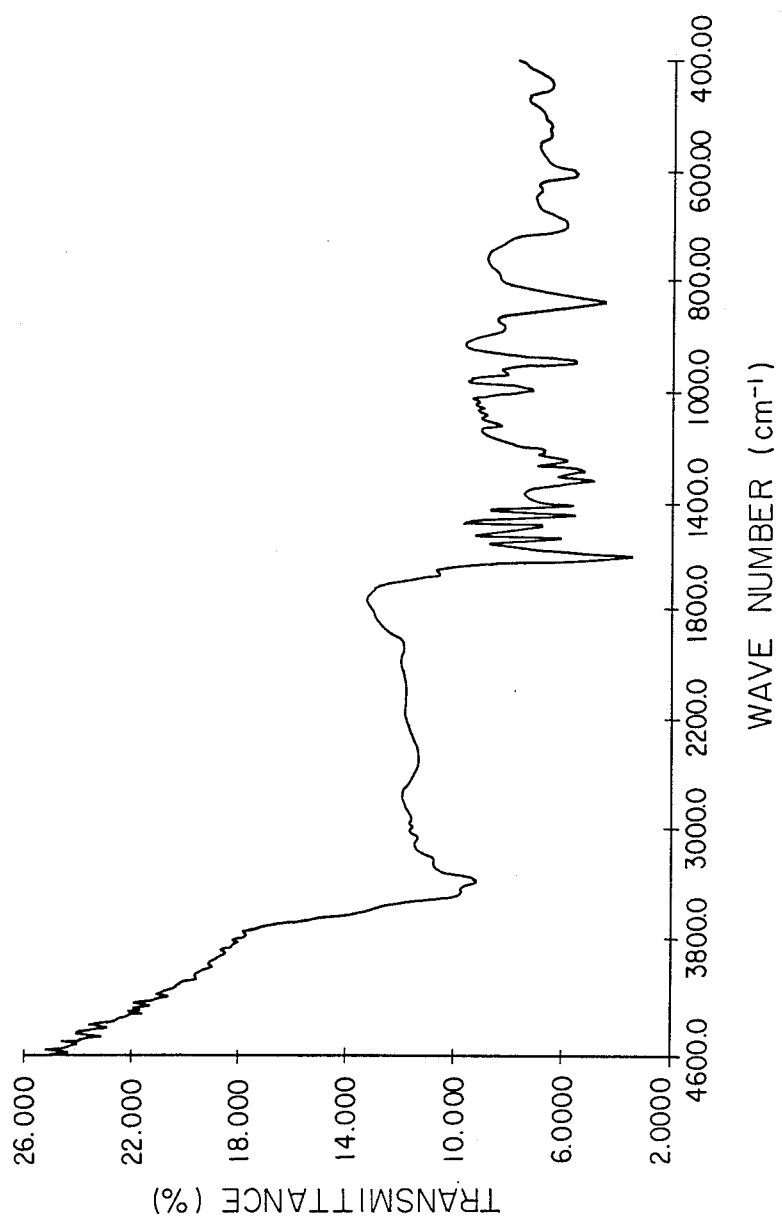
FIG. 6 is a graph showing an infrared spectrum of the product in Example 3.

The resulting product was subjected to infrared spectrum analysis. The results are shown in FIG. 6. It was confirmed from the comparison between FIGS. 1 and 5 that the product was a prepolymer of poly-p-phenylenebenzobisthiazole.

Example 4

The polymerization reaction was conducted in the same manner as in Example 1 except for changing the stirring time under the temperature condition of 110° C. after mixing 2,5-diamino-1,4-benzenedithiol dihydrochloride, polyphosphoric acid and terephthalic acid dichloride.

Figure 7:
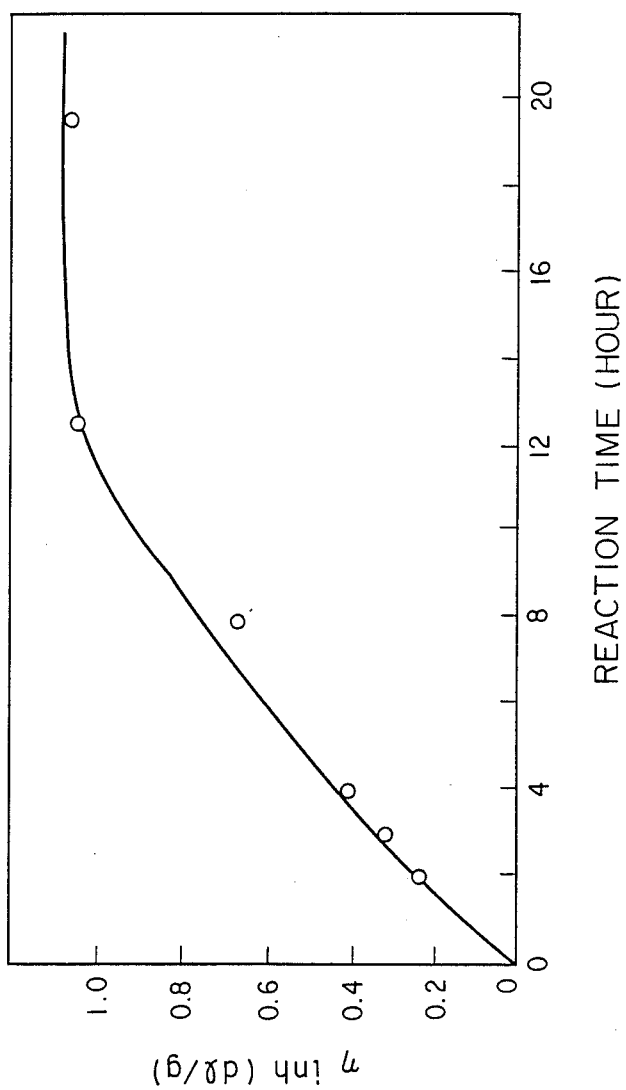
FIG. 7 is a graph showing the relation between stirring time and inherent viscosity.

With respect to the resulting product, the relation between its inherent viscosity and the stirring time is shown in FIG. 7. It is clear from FIG. 7 that the reaction completed in about 12 hours, producing a prepolymer of poly-p-phenylenebenzobisthiazole having an inherent viscosity $\eta_{inh}$ (in chlorosulfonic acid at 30° C.) of 1.07 dl/g.

Example 5

Inherent viscosity was measured in chlorosulfonic acid at 30° C. on the prepolymer obtained in Example 1 as well as on a prepolymer obtained under the same conditions as in Example 1 by using as a dicarboxylic acid derivative terephthalonitrile and diphenyl terephthalate, respectively. The measurement of the inherent viscosity was conducted after heating each prepolymer at 110° C. for 2 hours. The results are shown in Table 1.

TABLE 1

| Dicarboxylic Acid Derivative | Inherent Viscosity $\eta_{inh}$ (dl/g) |
|---|---|
| Terephthalic Acid Dichloride | 0.24 |
| Terephthalonitrile | 0.12 |
| Diphenyl Terephthalate | 0.09 |

It is clear from Table 1 that any of terephthalic acid dichloride. terephthalonitrile and diphenyl terephthalate can form the prepolymer of poly-p-phenylenebenzobisthiazole, and that terephthalic acid dichloride is the most effective as a terephthalic acid derivative.

Example 6

To investigate the influence of the concentration of polyphosphoric acid on the synthesis of the prepolymer of poly-p-phenylenebenzobisthiazole, the polymerization reaction was conducted in the same manner as in Example 1 except for changing the orthophosphoric acid percentage (polyphosphoric acid/orthophosphoric acid × 100) of the polyphosphoric acid used from 110% to 115%. The results are shown in Table 2 for the orthophosphoric acid content of 110% and 115%.

TABLE 2

| Concentration of Polyphoshoric Acid | Inherent Viscosity (dl/g) |
|---|---|
| 110% | 1.02 |
| 115% | 1.53 |

It is clear from the above results that as the effective content of polyphosphoric acid increases, the resulting prepolymer has a higher molecular weight.

Comparative Example 2

The polymerization reaction was conducted under the same conditions as in Example 1 except for substituting terephthalic acid for terephthalic acid dichloride. As a result, substantially no polymerization product was obtained.

Comparative Example 3

2.000 g of 2,5-diamino-1,4-benzenedithiol dihydrochloride was introduced into a 500-ml separable flask provided with a pipe filled with calcium chloride. 200 g of polyphosphoric acid (manufactured by Wako Junyaku K. K.) was added thereto in an argon flow. The resulting mixture was sufficiently stirred at room temperature for 48 hours and further stirred in an oil bath at 70° C. for 24 hours. After turned into a transparent solution, 1.355 g of isophthalic acid and 20 g of polyphosphoric acid were added. After isophthalic acid was fully dissolved at 120° C., stirring was conducted at 130° C. for 2 hours.

After completion of the reaction, the reaction solution was added to 500 ml of distilled water, sufficiently stirred, subjected to vacuum filtration by a glass filter (17G4), mixed with an aqueous solution of sodium hydrogen carbonate and then left to stand over night. Next, the same vacuum filtration was conducted, and the resulting filter cake was washed with distilled water several times and then with high grade methanol. It was finally dried at room temperature in vacuum for 48 hours to provide the reaction product.

Figure 8:
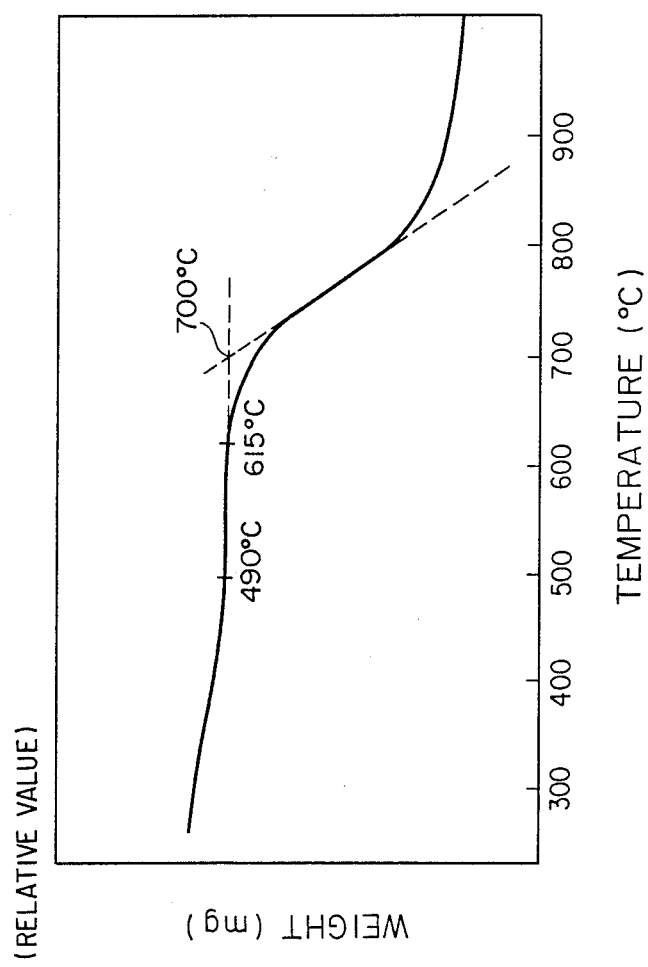
FIG. 8 is a graph showing the results of thermogravimetric analysis of the product in Comparative Example 3.

The reaction product was measured with respect to TGA at a temperature elevation rate of 20° C./min in $N_2$. The results are shown in FIG. 8. It is clear from FIG. 8 that its thermal decomposition start temperature was 700° C., suggesting that it is m-phenylene-type poly-p-phenylene benzobisthiazole. Since its weight loss is as small as 4% compared to 12% which is a theoretical value, it may be presumed that partial ring closure took place in this product. Accordingly, the polymerization reaction should be conducted at a lower temperature. This is also suggested by the fact that this product shows complicated infrared spectrum As described above in detail, since the method of producing the prepolymer of aromatic polythiazole according to the present invention uses an aromatic diaminodithiol compound salt and a dicarboxylic acid derivative, which can react with a phosphoric acid compound at 140° C. or lower, and comprises the step of polymerizing them in the presence of a phosphoric acid compound at as low a temperature as 70°-140° C. at which the ring closure reaction of the thiazole ring does not take place, the prepolymer of aromatic polythiazole can be obtained stably.

The prepolymers of aromatic polythiazole obtained by the method of the present invention may be uniformly mixed with matrix polymers or their prepolymers in organic solvents' and subjected to a ring closure reaction by heating to provide molecular composite materials. The resulting molecular composite materials have good mechanical properties, heat resistance, solvent resistance, etc. Because of such good properties, they can be used as high-strength, heat-resistant engineering plastic materials for automobile parts, aircraft parts, etc.

What is claimed is:

1. A method of producing a prepolymer of aromatic polythiazole from an aromatic diaminodithiol compound salt and a dicarboxylic acid derivative, comprising the step of polymerizing said aromatic diaminodithiol compound salt and said dicarboxylic acid derivative in the presence of a phosphoric acid compound at a temperature of 70°-140° C.

2. The method according to claim 1, wherein said phosphoric acid compound is polyphosphoric acid.

3. The method according to claim 1, wherein said dicarboxylic acid derivative is terephthalic acid dichloride.

4. The method according to claim 2, wherein said dicarboxylic acid derivative is therphthalic acid dichloride.

* * * * *